April 20, 1948.  J. A. E. LACHAPELLE  2,439,897
MOTOR AND MOTOR FUEL TREATMENT
Filed March 2, 1944

Inventor·
Joseph A. Ephraim Lachapelle

By Randolph & Beavers
Attorneys

Patented Apr. 20, 1948

2,439,897

UNITED STATES PATENT OFFICE 2,439,897

MOTOR AND MOTOR FUEL TREATMENT

Joseph A. Ephraim Lachapelle, Los Angeles, Calif.

Application March 2, 1944, Serial No. 524,770

4 Claims. (Cl. 123—1)

This invention relates to an internal combustion motor fuel, its treatment and the treatment of the internal working parts of the engine.

The invention is carried out by the presence of metallic lead in the combustion chambers of such motors.

Usually, to effect the end stated, minute or comminuted particles of metallic lead, with or without admixtures, are supplied to the gasoline or other hydrocarbon fuel for mixture entering the combustion chambers of the engines, so as to be supplied to such chambers therewith, in order to effect improvements in economy, performance, longer life and superior functioning of the engines in general.

The presence of metallic lead in the combustion chambers of an internal combustion engine will raise the anti-knock rating of the fuel being under combustion in such chambers at that time.

The same results are attained whether or not pure metallic lead is used or an alloy containing lead is employed.

I find that the metallic lead used as stated, raises the critical compression pressure of the fuel, usually referred to as anti-knock, to a higher value than known anti-knock agents especially within the necessary price range.

The metallic lead reduces wear in the engine and as an anti-friction agent, increases service life of the engine, filling up and coating the pores of the metallic walls of the cylinders, the valve guides and valve stems, thus surfaces which are usually starved for lubrication. The lead or lead alloy-coated surfaces require less lubrication and have a lower friction ratio, thereby reducing the friction and friction heat between the piston and cylinder walls and also giving faster operating valve action by reducing friction between valve stems and valve guides.

Further advantages are attained since the coating of lead by itself or as an alloy in the engine greatly reduces the adhesion of carbon to the surfaces, especially to the valve stems and valve guides, thereby greatly reducing the sticking and slowing down of valve action. The reduced adhesion of carbon plus the higher anti-knock value of the fuel makes it unnecessary to service an engine so treated for carbon removal. Cheaper fuel of lower anti-knock value can be used.

The invention may be practiced or carried out in various ways. In the further consideration of the invention, reference to "lead" is to be construed not only as referring to metallic lead but also to include any alloy-containing metallic lead.

The metallic lead is supplied to the combustion chambers of an engine through the flow of the fuel, air, oil or any combination thereof taken into the combustion chamber of such engine during normal operation. In following such methods, the lead is reduced to a powder or fine enough particles so that the fuel, air or oil will carry it into the combustion chamber. Such dust or particles may be produced beforehand and serviced to the vehicle, or they may be formed in the vehicle or the engine. The usual method is to carry the metallic lead into the combustion chambers in suspension in the fuel since the particles will be prevented from settling through the motion of the vehicle equipped with the engine.

The invention may be practiced with a solid piece or pieces of lead or lead alloy by placing the same in the gas tank of the vehicle and left free to move. The lead being soft, as it is rubbed or contacts the wall of the tank through the vibration of the vehicle, sliding and rolling, abrades or wears off small particles of itself, which will be in suspension in the fuel.

As a dust or powder, the metallic lead may be inserted into the fuel tank, or filter or upper cylinder oiler.

The particles of lead may be incorporated in a fuel-soluble compound shaped as pellets which may then be used as the dust or powder.

The dust particles may be pre-mixed with oil and used as required either in the fuel or upper cylinder oiler.

Another manner of furnishing lead to the combustion chamber is by changng or altering certain parts of which the engine is composed, for instance, by coating or plating with lead, the inside surface of the intake manifold or other surface over which air or air-fuel mixture passes such as the inside carburetor passage or carburetor throttle passage or air passage to the carburetor. The introduction of special parts such as a screen, diffuser or any other surface, plated or covered with lead and placed in the air or air fuel passage of the combustion chamber, will attain the same ends. In all of these cases, the air or air fuel passing on or through the various lead-treated or coated surfaces has enough friction to wear away the coating and carry the lead to and in the combustion chambers.

Tests have shown that even a heavy excess of metallic lead particles in combustion chambers has no detrimental effects.

I have found that through the practice of the invention, there is an increase in the critical compression pressure of gasoline fuel from 60 pounds to more than 150 pounds, that there is a much cooler running engine, that there is an increase in torque, the servicing of engines remains effective for longer periods, troubles due to faulty valve action or failure are greatly reduced and the life of the valves is increased, that the removal of carbon from the combustion chamber is practically eliminated and that there is better fuel performance and economy.

The invention provides a way to attain practically the same performance from low-octane gasoline or fuels as is obtained from high-octane gasoline or motor fuels.

A material advantage in using metallic lead is that its beneficial action starts at the beginning of combustion, while with a lead compound, the beneficial action does not start until subsequent to the start of combustion.

A presently preferred embodiment of the invention is disclosed in the drawing, wherein.

Figure 1:
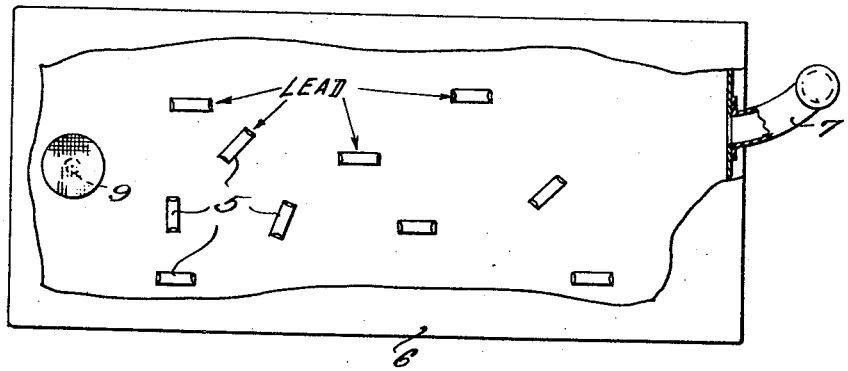
Figure 1 is a plan view, partly broken away, showing a conventional motor vehicle gasoline tank with one embodiment of the invention applied thereto.

Referring more particularly to the drawing, illustrating a preferred embodiment of the invention, the numeral 5 designates each of a plurality of metallic lead sticks or blocks, comprising the invention.

Figure 2:
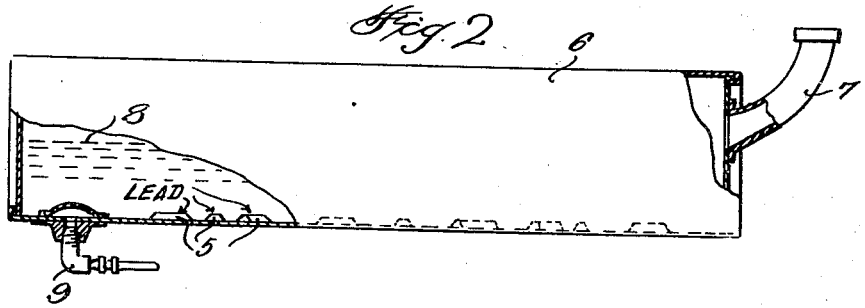
Figure 2 is a side elevational view of the gasoline tank, partly broken away.
Figure 3:
Figure 3 is a perspective view of one of the lead sticks.

A plurality of the sticks or blocks are adapted to be applied to a conventional gasoline tank 6 of a motor vehicle, not shown, through the filling neck 7 thereof and will settle to the bottom of the tank 6. The gasoline, indicated at 8 in Figure 2 contained within the tank 6, will be caused to surge within said tank by the vibration thereof when its supporting vehicle is in motion. The surging gasoline will carry the lead sticks 5 back and forth within the tank 6 and in scraping engagement with the bottom and sides thereof, thus abrading fine particles of the lead from the sticks or blocks and which are carried with the gasoline from the tank through the fuel line 9 therefrom leading to the combustion chambers, not shown. These lead particles, not shown, will coat the cylinder and piston surfaces of such engine as well as the wearing surfaces of the valves.

The metallic lead or lead alloy sticks 5 may be made of any size and shape so long as they can pass into the tank 6 through its neck 7 and will not pass outwardly therefrom through the fuel line 9. Likewise, the number of sticks 5 will vary depending upon their size.

Various modifications and changes are contemplated and may obviously be resorted to, without departing from the spirit or scope of the invention as hereinafter defined by the appended claims.

I claim as my invention:

1. The method of improving fuel combustion by introducing an element that is beneficial in comminuted form into the fuel mixture of an internal combustion engine, whereby to feed the said element into the chamber of combustion together with said fuel mixture, said element consisting of metallic lead in the form of a solid piece deposited in the fuel tank of the engine, thereby to be frictionally comminuted by contact with the wall of the tank through the engine vibration.

2. The method of improving fuel combustion by introducing a beneficial element in comminuted form into the fuel mixture of an internal combustion engine, whereby to feed the said element into the chamber of combustion together with said fuel mixture, said element consisting of an alloy containing lead in the form of a solid piece deposited in the fuel tank of the engine, thereby to be frictionally comminuted by contact with the wall of the tank through engine vibration.

3. The method of supplying an anti-friction element to the working parts of an internal combustion engine which method consists of supplying the anti-friction element in comminuted form into the fuel mixture of such engine, whereby to feed the said element into the chamber of combustion together with said fuel mixture, said anti-friction element consisting of metallic lead in the form of solid pieces deposited in the fuel tank of the engine, thereby to be frictionally comminuted by contact with the wall of the tank thereof through engine vibrations.

4. The method of supplying an anti-friction element to the working parts of an internal combustion engine, which method consists of supplying the anti-friction element in comminuted form into the fuel mixture of such an engine, whereby to feed the said element into the chamber of combustion together with said fuel mixture, said anti-friction element consisting of lead alloy in the form of solid pieces deposited in the fuel tank of the engine, thereby to be frictionally comminuted by contact with the wall of the tank through engine vibrations.

JOSEPH A. EPHRAIM LACHAPELLE.

REFERENCES CITED

The following references are of record in the file of this patent:

UNITED STATES PATENTS

| Number | Name | Date |
|---|---|---|
| 1,975,619 | Rector | Oct. 2, 1934 |
| 1,989,113 | Rector | Jan. 29, 1935 |